July 18, 1933.  J. O. GETTE, JR  1,918,904
AEROPLANE ATTITUDE INDICATOR
Filed July 21, 1930
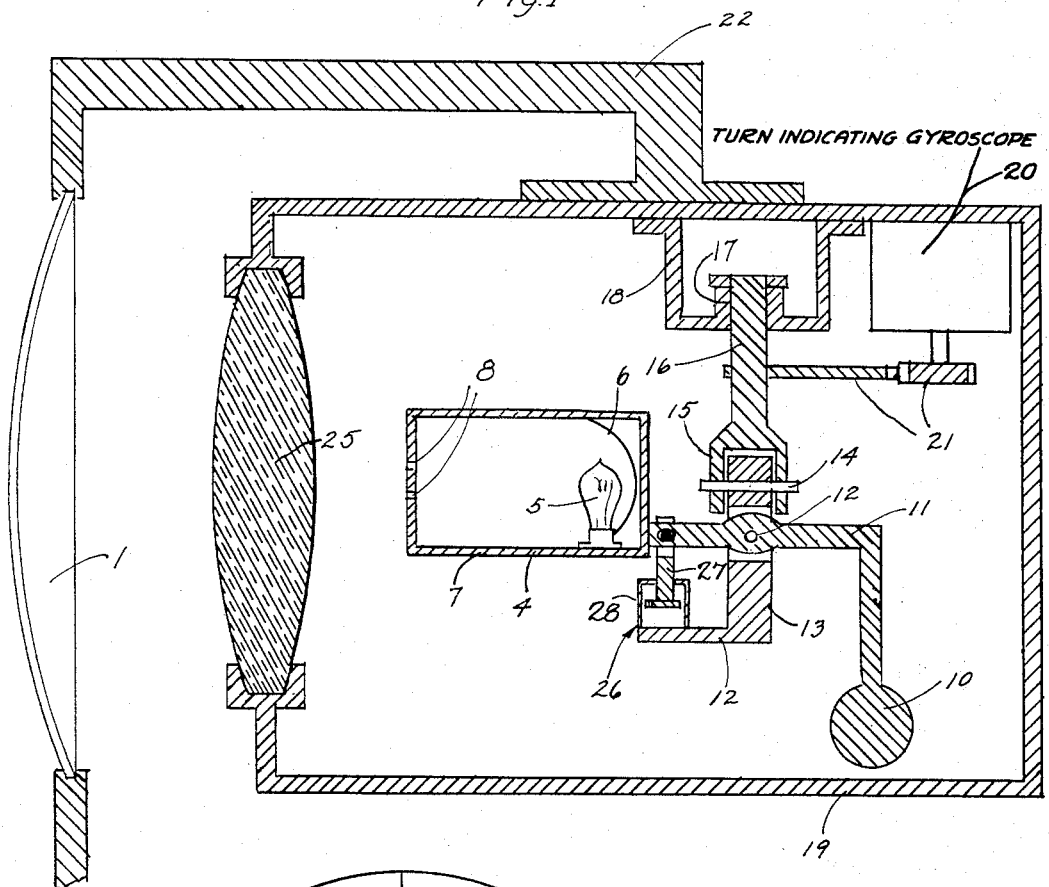
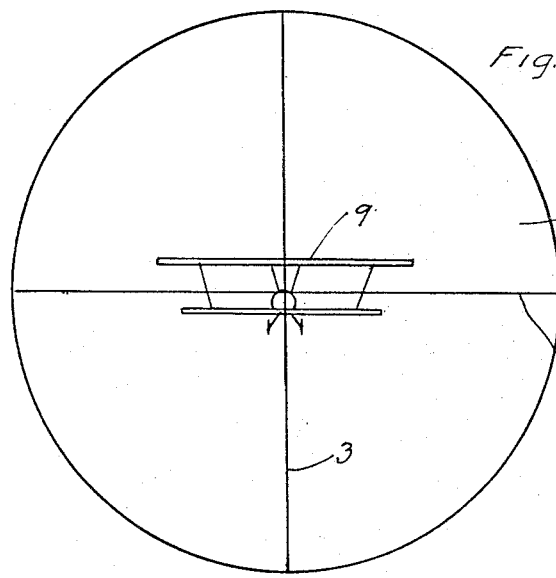
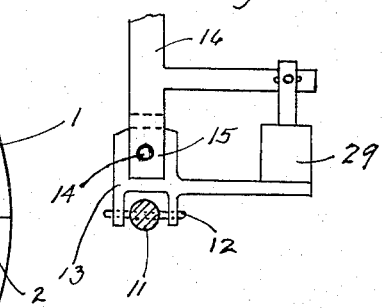
INVENTOR
JOHN O. GETTE JR.
BY
Bartlett Eyre Scott & Keel
ATTORNEYS Patented July 18, 1933

1,918,904

UNITED STATES PATENT OFFICE

JOHN O. GETTE, JR., OF YONKERS, NEW YORK, ASSIGNOR TO PIONEER INSTRUMENT COMPANY, INCORPORATED, OF BROOKLYN, NEW YORK, A CORPORATION OF NEW YORK

AEROPLANE ATTITUDE INDICATOR

Application filed July 21, 1930. Serial No. 469,505.

This invention relates to position flying instruments for aeroplanes.

The object of the invention is a simplified unitary instrument for indicating the flying attitude of the aeroplane at all times whereby the pilot may by simply observing one single instrument know whether his machine is at the proper attitude for safe flying under all conditions.

For a better understanding of the invention reference may be had to the accompanying drawing forming a part of this application wherein:

Fig. 1 is a sectional and partly diagrammatic view of an instrument embodying the principles of my invention, Fig. 2 is a view of the dial thereon, and Fig. 3 is a view of a detail.

The instrument may be mounted in any suitable part of the aeroplane, as for example adjacent or partly upon or wholly upon the usual instrument board. The instrument includes a dial or screen 1, as for example of ground glass, which is mounted in the instrument panel of the aeroplane and this dial is provided with a pair of perpendicular lines 2 and 3 with reference to which a projected image of an aeroplane or other device simulating the craft in flight is compared to determine and show at a glance to the pilot the real attitude of the craft.

The instrument also includes a projector 4 having a light source 5 and a reflector 6 this projector being mounted to assume attitudes corresponding to those of the craft in flight and having an enclosing casing 7 with slots or other means 8 in its forward end to enable the projector to project upon the screen 1 its attitude. In the particular embodiment shown the slots 8 are adapted to form a device simulating an aeroplane 9 to be projected upon the screen. The projector is rigidly connected with a pendulum 10 and the two as a unit are mounted for universal movements. For example a horizontal arm 11 rigidly connects the two parts together and this arm is pivoted for rocking movements in vertical planes about a pivotal axis 12 upon a member 13 which in turn is pivotally mounted on a pivotal axis 14 between the fingers of a fork 15 for movements in transverse planes. The fork 15 forms a part of a vertical shaft 16, the latter being journalled at 17 in a casing or bracket 18 carried on the interior of a casing 19 housing the movable parts of the instrument. At 20 I have indicated a gyroscope or means similar to an earth inductor compass for imparting to the shaft 16 rotary movements corresponding to the turning movements of the craft, and at 21 I have indicated gearing means between the device 20 and the shaft 16. The casing 19 may be carried by any suitable part of the aeroplane framework indicated for example at 22.

Pitching or banking movements of the craft are indicated upon the dial 1 by the shifting of the projected view or image 9 relatively to the two cross lines 2 and 3. The gyroscope 20 or similar device causes the indication of turning movements. In making a turn the gyroscope or inductor compass swings the projector about its vertical axis 16 displacing the image 9 in a horizontal direction while the universally mounted projector and pendulum will give an indication as to whether the proper bank is being maintained. If the proper bank is maintained during the turn the aeroplane image will be parallel to the horizontal cross line on the screen. If it is not parallel the controls are moved normally to bring the image parallel. For level straight flight the image is always kept at the intersection of the cross lines parallel to the horizontal or line 2. To fly an aeroplane with this instrument installed the pilot need only to keep the image parallel to the horizontal. For straight flight the image is kept at the intersection and during turns the image is moved either left or right depending on the direction of the desired turn. For ascending or descending the pilot keeps the image 9 above or below the line 2. The indicating means, therefore, for all flying conditions is provided in one single unit so that the pilot is not required to divide his attention among several different instruments and, moreover, by means of the particular arrangement shown a realistic picture of the craft attitude at all times is before the pilot, thereby requiring no special instruction as to how it is to be used.

At 25 I have shown a lens 7 between the projector and the screen consisting of a cylindrical lens for the purpose of reversing the motion of the image in rotation about its longitudinal axis. By using this lens the image rotates in the proper direction so that no reversal of the controls is necessary to correct for an improper attitude of the aeroplane.

At 26 I have indicated diagrammatically a damping device for preventing undue oscillations of the universally mounted projector. This damping device may consist of any suitable means, as for example a piston 27 moving in a cylinder 28 containing a liquid, the piston having a small hole in it or passage around it for the passage of liquid from one side of the piston to the other. The device 26 is connected between the member 13 and the arm 11 to damp the movements in vertical planes. A similar device 29 is connected between the shaft 16 and the member 13 (Fig. 3) to damp the movements in transverse planes. It is understood that any suitable damping means may be provided in the place of the devices shown.

I claim:

1. In a position indicating instrument for aircraft, a pendulus device mounted for movement about the longitudinal and transverse axes of the craft, a turn indicating gyroscope for orienting the pendulus device about the vertical axis of the craft, a projector including a source of light and means for forming an image simulating an aircraft, said projector being carried by and movable with said pendulus device whereby the aircraft image moves in response to and in accordance with the motion of the craft about its three axes, and means for receiving said image.

2. In a position indicating instrument for mobile vehicles, means responsive to the inclination of a vehicle about its longitudinal and transverse axes, means responsive to the turning of the vehicle about its vertical axis and operatively connected to said first-mentioned means for orienting the latter about said vertical axis, a projector including a source of light and means for forming an image simulating said vehicle, said projector being carried by and movable with said first-mentioned means whereby the vehicle image moves in response to and in accordance with the motion of the vehicle about its three axes, and means for receiving said image.

3. In a position indicating instrument for mobile vehicles, means responsive to the inclination of the vehicle about its longitudinal and transverse axes, means responsive to the turning of the vehicle about its vertical axis and operatively connected to said first-mentioned means for orienting the latter about said vertical axis, a projector including a source of light and means for forming an image simulating said vehicle, said projector being carried by and movable with said first-mentioned means whereby the vehicle image moves in response to and in accordance with the motion of the vehicle about its three axes, means for reversing said image, and means for receiving said reversed image.

4. In a position indicating instrument for aircraft, means responsive to the inclination of the craft about its longitudinal and transverse axes, means responsive to the turning of the craft about its vertical axis and operatively connected to said first-mentioned means for orienting the latter about said vertical axes, a projector including a source of light, a screen and means for reflecting light rays from said source through said screen, the latter being so designed that the rays passing therethrough form an image simulating an aircraft, said projector being carried by and movable with said first-mentioned means whereby the aircraft image moves in response to and in accordance with the motion of the craft about its three axes, and means for receiving said image.

5. In a position indicating instrument for aircraft, a pendulus device mounted for movement about the longitudinal and transverse axes of the craft, a turn indicating gyroscope for orienting said pendulus device about the vertical axis of the craft, a projector including a source of light, a screen, and a reflector for reflecting light rays from said source through said screen, the latter being so designed that the rays passing therethrough form an image simulating an aircraft, said projector being carried by and movable with said pendulus device whereby the aircraft image moves in response to and in accordance with the motion of the craft about its three axes, means for reversing said image, and means for receiving said reversed image.

JOHN O. GETTE, Jr.